Aug. 17, 1948.                S. W. WALKER                2,447,220
                          MOVING FLOOR FOR VEHICLES
Filed Oct. 13, 1945                                3 Sheets-Sheet 1
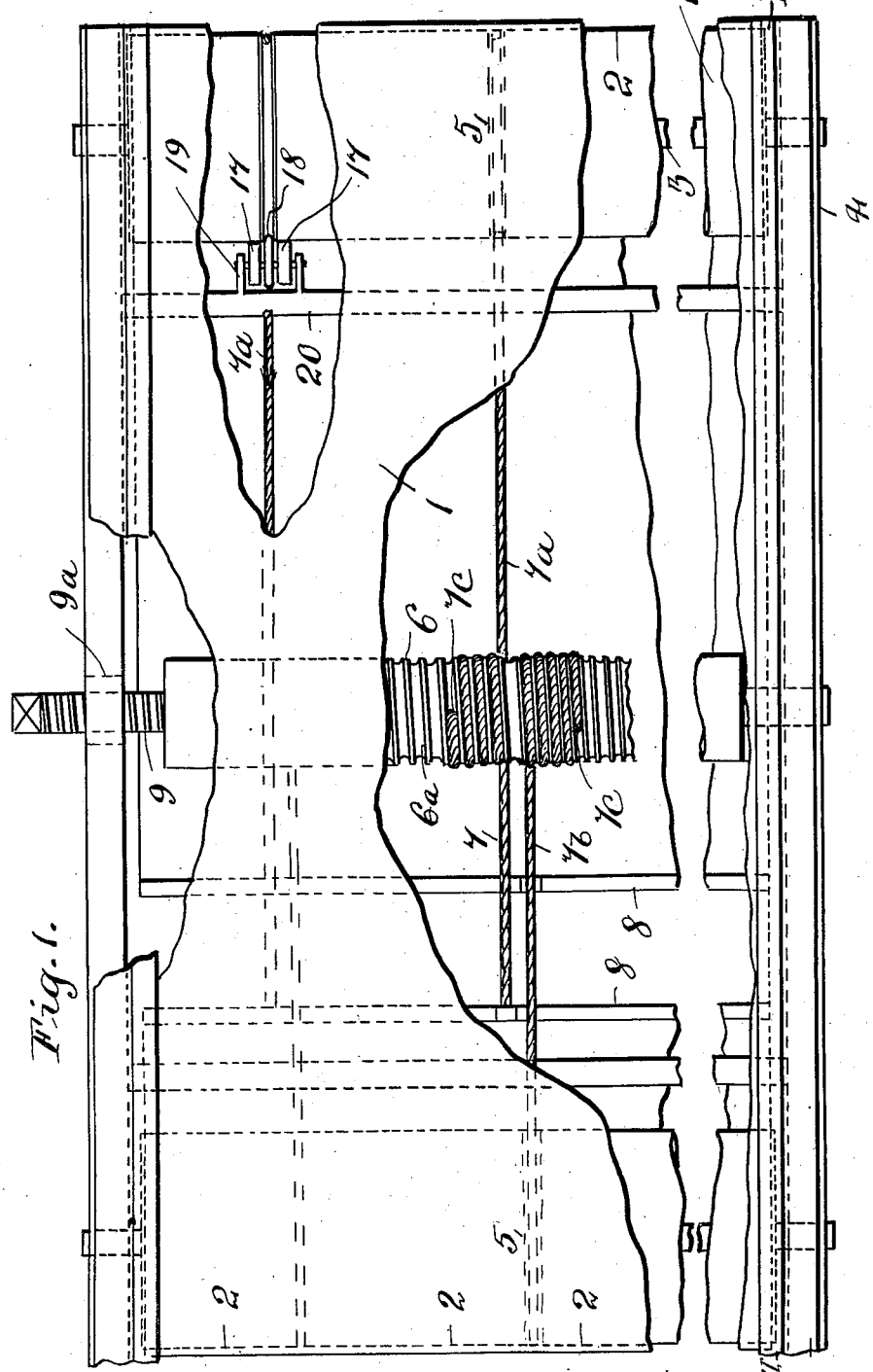
INVENTOR:
STANLEY WOOD WALKER
BY Leon M. Strauss Aug. 17, 1948.  S. W. WALKER  2,447,220
MOVING FLOOR FOR VEHICLES
Filed Oct. 13, 1945  3 Sheets-Sheet 2
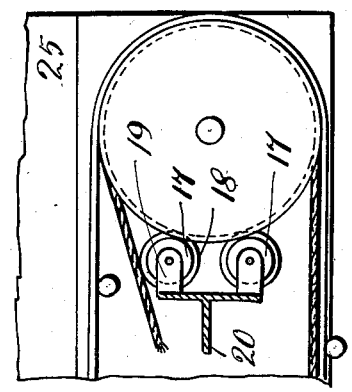
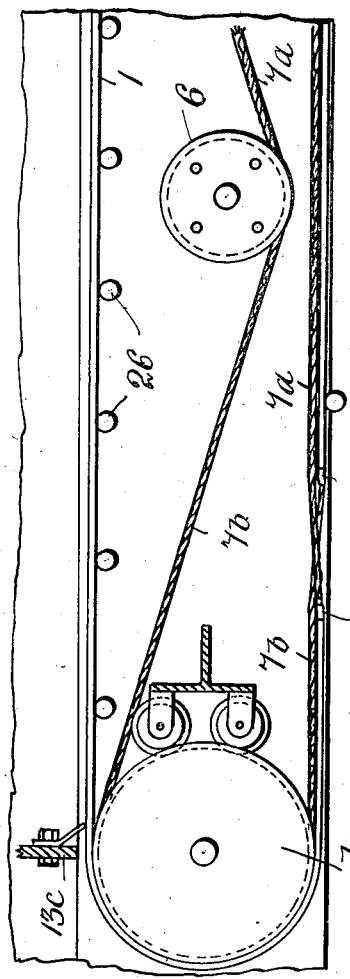
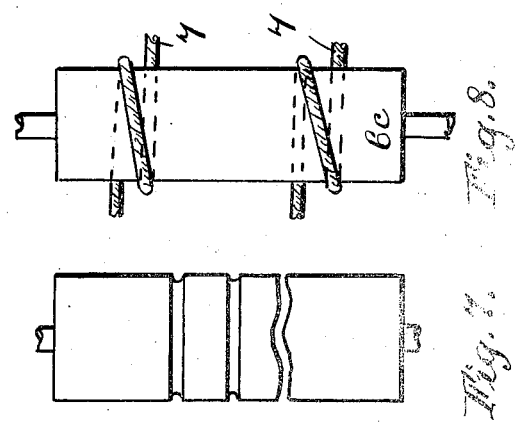
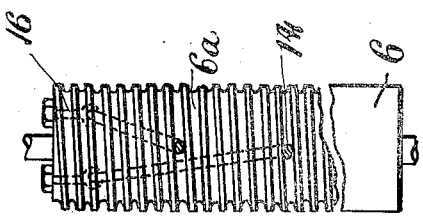
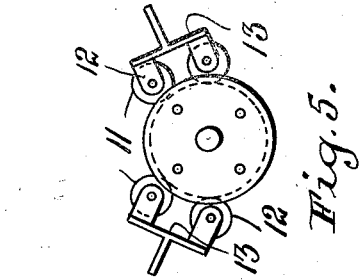
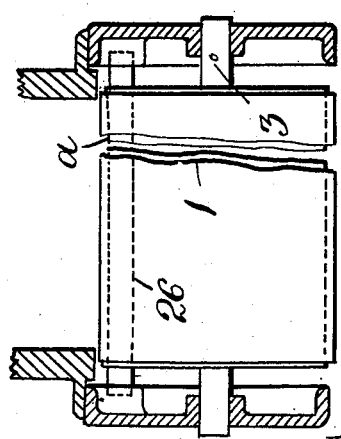
INVENTOR:
STANLEY WOOD WALKER
BY Leon M. Strauss Aug. 17, 1948.     S. W. WALKER     2,447,220
MOVING FLOOR FOR VEHICLES
Filed Oct. 13, 1945     3 Sheets-Sheet 3
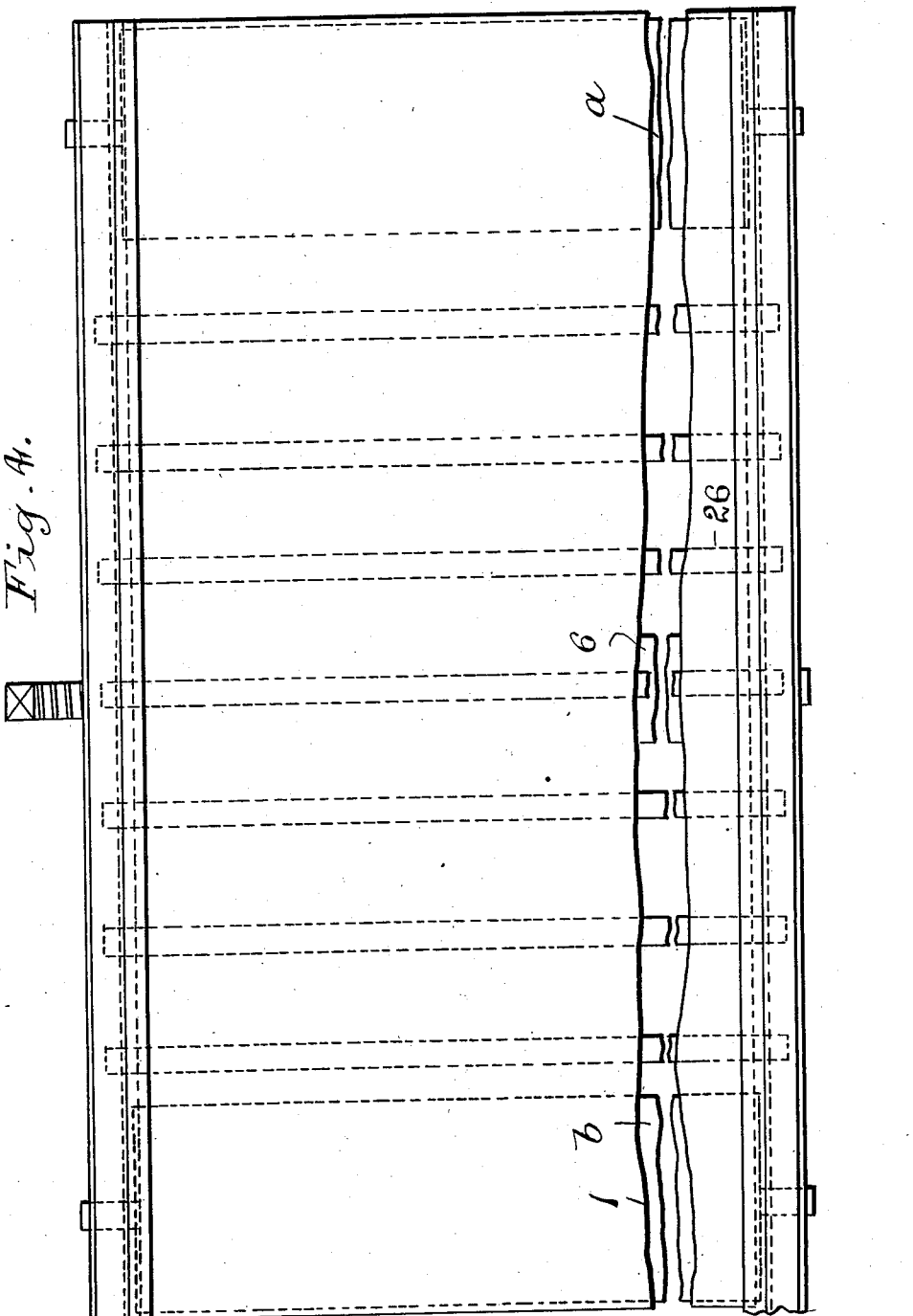
INVENTOR:
STANLEY WOOD WALKER
BY

UNITED STATES PATENT OFFICE 2,447,220

MOVING FLOOR FOR VEHICLES

Stanley Wood Walker, Workington, England, assignor of one-half to Allan Maclachlan, Wolverhampton, England Application October 13, 1945, Serial No. 622,230
In Great Britain October 31, 1944

1 Claim. (Cl. 214—83.36)

This invention relates to a moving floor or support for road or rail vehicles or the like to facilitate loading or unloading from one end or side, and it has for its object an improved construction.

According to the present invention, a moving floor for a vehicle comprises a flexible band or belt forming the floor surface, a roller support mounted on the frame of the vehicle at each end of the floor and around which the ends of the flexible band passes, an operating member rotatably mounted on the said frame intermediate the said rollers, and a flexible tension device connecting the ends of the band and coiled around the operating member so that when such operating member is rotated the flexible tension device is coiled thereon to pull one end of the band towards the operating member and uncoiled therefrom to permit of movement of the other end of the band. The flexible tension device passes in each direction from the operating drum and around a roller unit for connection to the end of the flexible band wrapped around the other roller unit. The tension device conveniently comprises a rope or like flexible member connected at each end to the flexible band and coiled intermediate each end on the operating member which may be in the form of a drum or cylinder. The drum or cylinder may have a helical groove therein in which the rope or the like is coiled. The rope or the like may be in two sections connected at their outer ends to the respective ends of the flexible band, whilst the inner ends are coiled on the operating member and anchored thereto by means of an adjustable tensioning device. The operating drum may be axially movable, and conveniently the spindle of the operating drum is screw threaded and engaged in a screw threaded nut or bearing, or again the helical groove in the operating drum may be engaged by a roller or rollers fixed against axial movement. The rollers at each end of the floor may be formed of a plurality of axially arranged rollers independently mounted on a spindle and between which a pulley is arranged for receiving the rope connected to an end of the flexible band.

Referring to the drawings which show embodiments of the invention:

Figure 1 is a plan view of a moving floor constructed according to the invention, the idler rollers supporting the straight run of the belt or band being omitted for convenience of illustration.

Figure 2 is a section on line II—II of Figure 1.
Figure 3 is an end view.

Figure 4 is a plan view of a floor.
Figure 5 is an end view of an operating drum showing means for obtaining endwise movement thereof.
Figure 6 is a plan view of a modified form of operating drum.
Figure 7 is a plan view of the supporting drum unit detached, and
Figure 8 shows a modified form of operating the tension rope.

According to a convenient embodiment of this invention, the whole of a moving floor of a rail or road vehicle comprises a flexible belt or band 1 which may be formed of rubberised fabric or any other suitable flexible material and each end is passed around supporting roller units $a$ and $b$ which each comprise a plurality of rollers 2 independently and freely mounted on the spindle 3 carried by the chassis or frame 4 of the vehicle and pulleys 5 interleaved between the rollers 2 and also independently and freely mounted on the spindle 3. An operating member comprising a winding drum 6 is mounted on the vehicle frame 4 intermediate said roller support units $a$, $b$ and the belt or band 1 is kept stretched in a taut condition and also operated by the drum 6 by means of flexible steel wire ropes 7 or flexible metallic tapes or the like (herein referred to as ropes). In the form shown by Figures 1 and 2, the rope 7 is formed in two sections 7a and 7b and their inner ends are anchored to the operating drum and each rope is coiled on the drum in opposite directions towards one another. The rope 7a leaving the drum 6 and passing round a pulley 5 on the roller support unit $a$ is connected at 10 to the end of the flexible band 1 passing round the roller support unit $b$. The rope section 7b leaves the operating drum and passes round a pulley 5 of the roller support unit $b$ and is connected to the end 10a of the flexible band 1 passing round the roller support unit $a$. When therefore the operating drum 6 is rotated clockwise the rope section 7a will apply a pull at the end 10 of the flexible band, whilst the rope section 7b will uncoil from the drum 6 so that the end 10a of the flexible band can move accordingly by the pull transmitted through the rope section 7a. When the drum 6 is rotated anticlockwise the pull is through the rope section 7b. The rope sections 7a and 7b constantly maintain tension tending to pull the ends 10 and 10a together to maintain the band in constant tension. The length of rope coiled on the drum 6 serves to restrict the length of travel of the belt 1. The drum 6 conveniently has helical grooves 6a therein for receiving the coils of the ropes and therefore prevents the possibility of the coils overlapping. The pitch of the helical groove is greater than the diameter of the rope and the sides of the groove are inclined to grip the rope. In order that the ropes 7a and 7b will be coiled and uncoiled at a constant position in relation to the frame and in alignment with the respective pulleys 5, the drum is adapted to move axially. This may be effected by a screw thread on one end of the spindle 9 carrying the operating drum and such spindle engages an internally screwed bearing 9a fixed in relation to the frame 4. The screw thread on the spindle is of the same pitch as a helical groove 6a and therefore when the roller or drum 6 is turned it will be moved axially. According to a modified form as shown by Figure 5, rollers 11 engaging the groove 6a are mounted on brackets 12 which are fixed to a cross member 13 forming part of the frame 4. These rollers which are prevented from having axial movement thus cause the operating drum 6 to move axially as it is rotated, the spindle of the drum floating in its bearings. The rollers 11 due to the peripheries contacting the roots of the helical grooves 6a resist any spring or strain on the drum 6 due to pull of the ropes 7a and 7b. The belt or band 1 is supported on idler rollers 26 mounted on the frame 4. A taut belt is necessary in order to secure ease of belt movement, where the nature of the load is semi-plastic such as wet sand, clay, ready-mixed concrete and the like materials, for, if such a load, carried upon a slack belt, festooned over supporting rollers 26, and, accentuated by the vibration of the vehicle during transit, has solidified on and to the configuration of the carrying belt resulting in the formation of what amounts to a series of scotches locking the belt, the belt may be damaged in the subsequent attempt at its movement.

With the object of enabling a reduction to be made in the weight of the components constituting this device which affects the tare weight and consequent pay load of a road vehicle, the drum 6 is placed in the approximate midway position relative to the position of pulleys units a and b, so that so far as the pivotal and bending stress upon the drum 6 is concerned, a major proportion of the rope strain consisting of considerable initial and constant tension (as distinct but in addition to rope tension due to tractive effort when the device is used) is cancelled out because the opposing tensions of the ropes 7a and 7b are almost opposite in direction at the sides of the drum 6, thus permitting a comparatively light construction of this part, any tendency to deflection of which being checked by the presence of the rollers 11 when utilised. In a further form, each rope section may pass through a hole 14 in the periphery of the hollow drum 6 and pass along the drum and be anchored to a tension adjusting member which may comprise an eye bolt 16 which passes through a hole in the end of the drum and is locked by means of a nut screwed on the projecting end of the bolt. By adjusting the eye bolt or like tensioner therefore, any desired tension may be placed on the ropes and therefore on the conveyor or floor band 1 and the band is also correctly positioned.

According to the form shown by Figure 8, the rope 7, in one piece is connected to one end of the belt which passes around the roller support unit a and is then carried round a pulley 5 of the other roller support b and is then directed to and coiled on the drum 6c and after being coiled on the drum 6c passes around a pulley 5 of the roller unit a and is connected to the other end of the belt. The rope being coiled around the drum 6c will be moved thereby, and when the operating drum is rotated, the rope passing from one end of the belt will be coiled thereon and at the same time the rope would be uncoiled from the drum 6c to permit the other end of the belt to move and the tension on the rope 7 will keep the two ends of the belt pulled towards one another to keep the belt or band in tension. With the aforementioned constructions a length of travel can be obtained which is longer than the length of the movable floor. Any number of tension members or ropes 7 can be utilised along the width of the floor. The ends of the belt to which the rope is connected may be strengthened by being clamped between metal strips 8. The grooves in the pulleys 5 are of a depth so that the outer periphery of the ropes passing therearound does not project beyond the surface of the rollers 2 and therefore does not prevent the band 2 freely bedding on the rollers and obviates any bulging of the belt by riding on the rope and also wear and tear caused by the belt and rope rubbing on one another. As the ropes grip on the pulley a lesser distance from the axis than the surfaces of the rollers 2, the speed of rotation of the pulley will vary from the speed of rotation of the rollers 2, but as the pulleys 5 and the rollers 2 are independently and freely mounted on the spindle 3, no friction or slip will take place. As the rollers 2 and pulleys 5 are freely and independently mounted on the spindle 3, they will not impart rigidity to the spindle, and in order to enable a spindle of small weight to be used, supporting rollers 17 and 18 are mounted on brackets 19 fixed to or forming part of a cross member 20 on the frame 4. The rollers 17 and 18 are independently mounted and the rollers 17 bear on the rollers 2 and the roller 18 engages the groove in the pulleys 5. These buffer wheels 17 and 18 counteract any deflection of the shafts 3 due to the combined imposed forces (A) the initial tension of the belt 1 created by the ropes 7, (B) belt tension due to gravity and road shocks when the carried load seeks to thrust and festoon the belt 1 downwards between each consecutive idler roller 26 and (C) tension due to the tractive effort of the ropes 7 when the belt 1 is pulled in either direction during the loading or unloading process. It will be appreciated that this moving floor permits the use of a belt sufficiently long in itself and in its permissible length of transverse (amounting to a greater length than is the distance between the drum centres a and b) to allow the use of a fixed wall plate barrier at 13a, and obviates the use of a wall place travelling with the moving belt, with its consequent friction and wedging of the load between it and the fixed sides of the vehicle body. Vertical confining sides defining the width of the body and conforming to the width to the belt 1 in use, are connected by the fixed wall plate barrier 13a, forming one body end, and arranged with its bottom edge to clear the top surface of the belt 1 to prevent any loaded loose materials packed against it, from being spilled off the belt 1 at that point both prior to and during the preliminary movement of the belt in its discharging direction, and to retain any materials which may tend to slump to their natural angle of repose until sufficient length of belt has moved that will convey the whole of the loose materials away from the barrier 13 towards a clean discharge over the further end of the body floor at point 25. The fully discharged position of the moving floor is where and when point 10 is situated at a position adjacent to the baffle board barrier 13a, whilst the opposite extreme of the travel of the floor formed by the belt 1 is when and where the point 10a has been wound to a position adjacent to the point 25, this travel thus representing a total movement of the belt formed floor, which in distance is in excess of the measurement between the barrier 13a and the discharge point 25 (at which point 25 a removable or swinging hinged tail board may be fitted to the fixed retaining vertical sides of the body).

Whilst the roller unit 6 is formed of a plurality of units it may be formed as a single unit as shown by Figure 7. The vehicle moving floor may be arranged on the vehicle for either side or end loading. Anti-sag rollers may be fitted to prevent the belt or band 1 fouling the frame of the machine.

Having thus described the invention, what is claimed as new and desired to be secured by Letters Patent, is:

A moving floor for a vehicle or like conveyance comprising a flexible band forming the surface of the floor of said vehicle, a roller support unit at each end of said floor surface and around which the ends of said flexible band pass, an operating drum, a tension device comprising a flexible rope formed in two parts, the inner ends of which are anchored to said operating drum and coiled thereon in opposite directions towards one another and after leaving the drum pass around one roller support unit back to an end of the floor band trained over the other roller support unit, and means for moving the operating drum axially whilst the drum is rotating to maintain the location at which the rope leaves the operating drum in alignment with the place of engagement of the rope with the respective roller support unit.

STANLEY WOOD WALKER.

REFERENCES CITED

The following references are of record in the file of this patent:

UNITED STATES PATENTS

| Number | Name | Date |
|---|---|---|
| 1,251,372 | Hewitt | Dec. 25, 1917 |
| 1,497,622 | Weber | June 10, 1924 |
| 1,626,041 | Kyle et al. | Apr. 26, 1927 |
| 1,945,532 | Lima | Feb. 6, 1934 |
| 2,264,157 | Baker et al. | Nov. 25, 1941 |
| 2,267,526 | Kutscha | Dec. 23, 1941 |

FOREIGN PATENTS

| Number | Country | Date |
|---|---|---|
| 12,879 | Great Britain | 1896 |
| 351,410 | Great Britain | June 24, 1931 |
| 419,351 | Great Britain | Nov. 9, 1934 |